United States Patent [19]
Abe

[11] Patent Number: 5,473,704
[45] Date of Patent: Dec. 5, 1995

[54] APPARATUS FOR SUBSTITUTING CHARACTER DATA FOR IMAGE DATA USING ORTHOGONAL CONVERSION COEFFICIENTS

[75] Inventor: Nobuaki Abe, Sapporo, Japan

[73] Assignee: Asahi Kogaku Kogyo Kabushiki Kaisha, Tokyo, Japan

[21] Appl. No.: 252,172

[22] Filed: Jun. 1, 1994

[30] Foreign Application Priority Data

Jun. 1, 1993 [JP] Japan ................................. 5-154384

[51] Int. Cl.⁶ .................................................. G06K 9/36
[52] U.S. Cl. ...................... 382/235; 358/433; 358/450; 345/194; 345/202; 382/250
[58] Field of Search ............................. 382/56; 395/110, 395/135, 150; 345/143, 192, 194, 202; 358/432, 433, 450; H04N 1/40

[56] References Cited

U.S. PATENT DOCUMENTS

| | | | |
|---|---|---|---|
| 3,824,546 | 7/1974 | Kawasaki et al. | 340/146.3 F |
| 3,869,697 | 3/1975 | Kawasaki | 340/146.3 P |
| 4,750,212 | 6/1988 | Yokomizo | 382/56 |
| 4,791,680 | 12/1988 | Yokoe et al. | 382/56 |
| 5,301,027 | 4/1994 | Kiyofugi et al. | 348/589 |

OTHER PUBLICATIONS

Arps et al., "Control Character Insertion into Arithmetically Encoded Strings", *IBM Technical Disclosure Bulletin*, vol. 25, No. 4, Sep. 1982, pp. 2051–2052.

*Primary Examiner*—Leo H. Boudreau
*Assistant Examiner*—Andrew W. Johns
*Attorney, Agent, or Firm*—Sandler, Greenblum & Bernstein

[57] ABSTRACT

A character font combining apparatus having a memory storing data-compressed image data by dividing a digital original image data into a plurality of blocks and applying orthogonal conversion and encoding to the image data for every block. The image data read out from this memory is decoded by a decoding processing circuit, and the orthogonal conversion coefficient is obtained for every block. A plurality of character fonts are stored in the font ROM, and each character font is constituted by at least the orthogonal conversion coefficient of one block, respectively. One of the block of the orthogonal conversion coefficient decoded by the decoding processing circuit and the block of the orthogonal conversion coefficient read out from the font ROM is encoded by the Huffman encoding processing circuit and written as the encoded data in the memory.

16 Claims, 9 Drawing Sheets

8 × 8 PIXEL BLOCK $$P_{xy} = \begin{bmatrix} 159 & 153 & 158 & 152 & 140 & 138 & 132 & 132 \\ 164 & 162 & 162 & 157 & 151 & 142 & 134 & 132 \\ 167 & 168 & 161 & 160 & 158 & 145 & 139 & 134 \\ 164 & 168 & 161 & 166 & 162 & 152 & 149 & 141 \\ 171 & 166 & 168 & 167 & 163 & 162 & 157 & 151 \\ 173 & 164 & 169 & 170 & 166 & 166 & 162 & 161 \\ 175 & 169 & 172 & 176 & 174 & 172 & 174 & 166 \\ 173 & 172 & 175 & 173 & 180 & 181 & 177 & 172 \end{bmatrix}$$

*Fig. 2A*

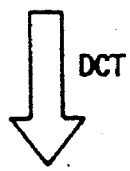 DCT

DCT COEFFICIENT $S_{00}$ $$S_{uv} = \begin{bmatrix} 260 & 49 & -16 & 5 & 2 & 4 & 0 & 1 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & -6 & -1 & 0 & -4 & -1 & 0 & -1 \\ -3 & -2 & -1 & -1 & 1 & 2 & -5 & -1 \\ -4 & -1 & 1 & 0 & 0 & -2 & 2 & 0 \\ 1 & 1 & 1 & 1 & -1 & 1 & 0 & 0 \end{bmatrix} \; S_{77}$$

QUANTIZATION TABLE $$\begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

QUANTIZATION ← $Q_{uv}$ =

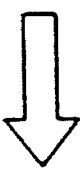

QUANTIZED DCT COEFFICIENT $$R_{uv} = \begin{bmatrix} 16 & 4 & -2 & 0 & 0 & 0 & 0 & 0 \\ -7 & 3 & 0 & 0 & 0 & 0 & 0 & 0 \\ 0 & -1 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

GROUPING OF DIFFERENTIAL VALUE OF DC COEFFICIENT

| SSSS GROUP NUMBER | DC DIFFERENTIAL VALUE | ADDED BIT NUMBER |
|---|---|---|
| 0 | 0 | 0 |
| 1 | -1, 1 | 1 |
| 2 | -3, -2, 2, 3 | 2 |
| 3 | -7..-4, 4..7 | 3 |
| 4 | -15..-8, 8..15 | 4 |
| 5 | -31..-16, 16..31 | 5 |
| 6 | -63..-32, 32..63 | 6 |
| 7 | -127..-64, 64..127 | 7 |
| 8 | -255..-128, 128..255 | 8 |
| 9 | -511..-256, 256..511 | 9 |
| 10 | -1023..-512, 512..1023 | 10 |
| 11 | -2047..-1024, 1024..2047 | 11 |

Fig. 5

CODE TABLE FOR DIFFERENTIAL DC COEFFICIENT

| SSSS | CODE LENGTH | CODE WORD |
|---|---|---|
| 0 | 2 | 00 |
| 1 | 3 | 010 |
| 2 | 3 | 011 |
| 3 | 3 | 100 |
| 4 | 3 | 101 |
| 5 | 3 | 110 |
| 6 | 4 | 1110 |
| 7 | 5 | 11110 |
| 8 | 6 | 111110 |
| 9 | 7 | 1111110 |
| 10 | 8 | 11111110 |
| 11 | 9 | 111111110 |

FOR LUMINANCE COMPONENT

Fig. 7

```
ZZ( )···0 RUN LENGTH :    -    0    0    1    0    2    0   54

EFFECTIVE COEFFICIENT : 16    4   -7    3   -2   -1   -1
         VALUE

DC VALUE(16)-PRECEDING DC(25)=DIFFERENTIAL(-9).SSSS=4.
             VALUE              DC VALUE
                                CODE WORD FOR SSSS→101
                                ADDITIONAL BIT→0110
ZZ01=( 4).SSSS=(3)RUN LENGTH=(0).
                                CODE WORD FOR SSSS→100
                                ADDITIONAL BIT→100
ZZ02=(-7).SSSS=(3)RUN LENGTH=(0).
                                CODE WORD FOR SSSS→100
                                ADDITIONAL BIT→000
ZZ04=( 3).SSSS=(2)RUN LENGTH=(1).
                                CODE WORD FOR SSSS→11011
                                ADDITIONAL BIT→11
ZZ05=(-2).SSSS=(2)RUN LENGTH=(0).
                                CODE WORD FOR SSSS→01
                                ADDITIONAL BIT→01
ZZ08=(-1).SSSS=(1)RUN LENGTH=(2).
                                CODE WORD FOR SSSS→11100
                                ADDITIONAL BIT→0
ZZ09=(-1).SSSS=(1)RUN LENGTH=(0).
                                CODE WORD FOR SSSS→00
                                ADDITIONAL BIT→0
EOB                             CODE WORD FOR EOB→1010

ENCODED DATE: 1010110100100100000110111101011110000001010
```

100

```
ZZ( )·· 0 RUN LENGTH :    -    0    0    1    0    2    0   54
EFFECTIVE COEFFICIENT : 16    4   -7    3   -2   -1   -1
         VALUE
```

ENCODED DATA
↓ DECODING

DECODED QUANTIZATION
DCT COEFFICIENT $$R_{uv} = \begin{bmatrix} 16 & 4 & -2 & 0 & 0 & 0 & 0 & 0 \\ -7 & 3 & 0 & 0 & 0 & 0 & 0 & 0 \\ 0 & -1 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

*Fig. 8A*

⇩ INVERSE QUANTIZATION ← $Q_{uv}$

DCT COEFFICIENT $$S_{uv} = \begin{bmatrix} 256 & 44 & -20 & 0 & 0 & 0 & 0 & 0 \\ -84 & 36 & 0 & 0 & 0 & 0 & 0 & 0 \\ 0 & -13 & 0 & 0 & 0 & 0 & 0 & 0 \\ -14 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

*Fig. 8B*

⇩ INVERSE DCT

DECODED 8 × 8 PIXEL BLOCK $$P_{xy} = \begin{bmatrix} 153 & 153 & 152 & 149 & 144 & 137 & 131 & 126 \\ 158 & 158 & 157 & 154 & 149 & 142 & 135 & 131 \\ 165 & 164 & 163 & 160 & 155 & 148 & 141 & 137 \\ 167 & 167 & 167 & 164 & 159 & 153 & 147 & 143 \\ 167 & 168 & 168 & 167 & 163 & 158 & 153 & 149 \\ 166 & 168 & 169 & 170 & 168 & 165 & 161 & 159 \\ 168 & 170 & 173 & 175 & 175 & 174 & 171 & 170 \\ 169 & 172 & 176 & 179 & 181 & 180 & 179 & 177 \end{bmatrix}$$

| IMAGE | "1" | "2" | "4" | IMAGE | |
|---|---|---|---|---|---|
| 13 | 4 | 6 | 2 | 16 | DC COMPONENT |
| 7 | −9 | 2 | −4 | 14 | DIFFERENTIAL VALUE |
| F11 | F12 | F13 | F14 | F15 | |

| IMAGE | "3" | "4" | "8" | IMAGE |
|---|---|---|---|---|
| (1 3) | 5 | 2 | 7 | (1 6) |
| ( 7 ) | a | b | c | d |
| F21 | F22 | F23 | F24 | F25 |

APPARATUS FOR SUBSTITUTING CHARACTER DATA FOR IMAGE DATA USING ORTHOGONAL CONVERSION COEFFICIENTS

BACKGROUND OF THE INVENTION

1. Field of the Invention

The present invention relates to an apparatus for combining a character font in an image subjected to data compression by encoding and stored in a recording medium.

2. Description of the Related Art

Image data prepared by converting an image obtained by a television camera etc. to a signal which can be treated by a digital signal processing apparatus such as a computer usually comprises a tremendous amount of information. Accordingly, if this image data is recorded in a recording medium as it is or is transmitted by modem by computer or the like, the efficiency would be very bad. Therefore, conventionally, information of image data has been compressed by encoding and then recorded in a recording medium or transmitted.

This data compression is carried out as follows.

First, the image data is subjected to analog-to-digital (A/D) conversion and stored in an image memory as digital image data. On the other hand, where a character font is superimposed at a predetermined pixel position of this image, the data of this character font is read out from a character font memory and the data of the image memory at that pixel position is substituted by the character font data for each pixel. In this way, the image data on which the character font is superimposed is read out from the image memory for every block of size consisting of 8×8 pixels, subjected to a discrete cosine conversion (hereinafter referred to as a DCT conversion), and converted to a DCT coefficient. This DCT coefficient is quantized, and this quantized DCT coefficient is subjected to Huffman encoding and data compression and then recorded in the recording medium.

Note that, Huffman encoding is an encoding procedure in which short code words are assigned to symbols having a high generation probability based on statistical analysis of the generation frequency of symbols of an information source and, at the same time, long code words are assigned to symbols having a low generation probability, whereby the average word length of the code words is shortened.

The image data (coded data) recorded in the recording medium is subjected to Huffman decoding and converted to the quantized DC coefficient and further subjected to inverse quantization to become a DCT coefficient. An inverse DCT conversion is carried out with respect to this inverse quantization DCT coefficient for every block consisting of 8×8 pixels so as to restore the image data. This image data is once written in the image memory, read out from this image memory, and converted to an analog signal and output to a display device.

Where a new character font is added to image data (coded data) recorded in the recording medium or where a character font which has already been superimposed on the image data is substituted by a new character font, after the original image data is restored from the encoded data, processing for adding the new character data to this restored data must be carried out. Namely, the encoded data read out from the recording medium is subjected to processings such as Huffman decoding, inverse quantization, inverse DCT conversion, etc., and then once written in this image memory, and the character font is written in the image data written in this image memory. Then, this image data is subjected to the processings of DCT conversion, quantization, Huffman encoding, etc. and recorded in the recording medium.

However, this type of decoding and encoding processing requires a long time, and enormous power is consumed by a circuit performing these processings.

SUMMARY OF THE INVENTION

Accordingly, the present invention has as its object to provide a character font combining apparatus which can make the processing easier when character data is added to image data after data compression and, at the same time, can suppress the power consumption required for the processing as much as possible.

According to the present invention, there is provided a character font combining apparatus provided with image data memory means, decoding means, character data storage means, encoding means, and substitution means.

The image data stored by the image data memory means is obtained by dividing digital original image data into a plurality of blocks and applying orthogonal conversion and encoding to the image data for every block. The decoding means decodes the image data read out from the image data memory means and finds an orthogonal conversion coefficient for every block. The character data storage means stores the character font constituted by at least the orthogonal conversion coefficient of one block. The encoding means encodes the orthogonal conversion coefficient for every block to obtain the encoded data and, at the same time, writes this encoded data in the image data memory means. The substitution means substitutes at least one block among the blocks of the orthogonal conversion coefficients outputted from the decoding means by an orthogonal conversion coefficient stored in the character data storage means and, at the same time, outputs this substituted orthogonal conversion coefficient to the encoding means.

Also, according to the present invention, there is provided a character font combining apparatus provided with orthogonal conversion means, encoding means, decoding means, character data storage means, and substitution means.

The orthogonal conversion means divides digital original image data into a plurality of blocks and finds the orthogonal conversion coefficient of the image data for every block. The encoding means encodes the orthogonal conversion coefficient and records the same in the memory. The decoding means decodes the image data recorded in the memory and finds the orthogonal conversion coefficient for every block. The character data storage means stores the character font constituted by at least the orthogonal conversion coefficient of one block. The substitution means substitutes at least one block among the blocks of the orthogonal conversion coefficients outputted from one of the orthogonal conversion means and decoding means by the orthogonal conversion coefficient stored in the character data storage means and, at the same time, outputs this substituted orthogonal conversion coefficient to the encoding means.

BRIEF DESCRIPTION OF THE DRAWINGS

FIGS. 2(a)–2(d) are views showing an example of a DCT conversion and quantization;

FIG. 4 is a view showing a group classification table of DC components used for Huffman encoding;

FIG. 5 is a view showing code words expressing group numbers;

FIG. 7 is a view showing an example of finding the encoded data from the quantized DCT coefficient;

FIGS. 8(a)–8(c) are views showing an example of decoding the image data by an IDCT conversion and inverse quantization from the encoded data;

FIG. 9 is a view showing a method of finding a differential value of the DC components in a substitution operation of the character font.

DESCRIPTION OF THE PREFERRED EMBODIMENTS

Figure 1:
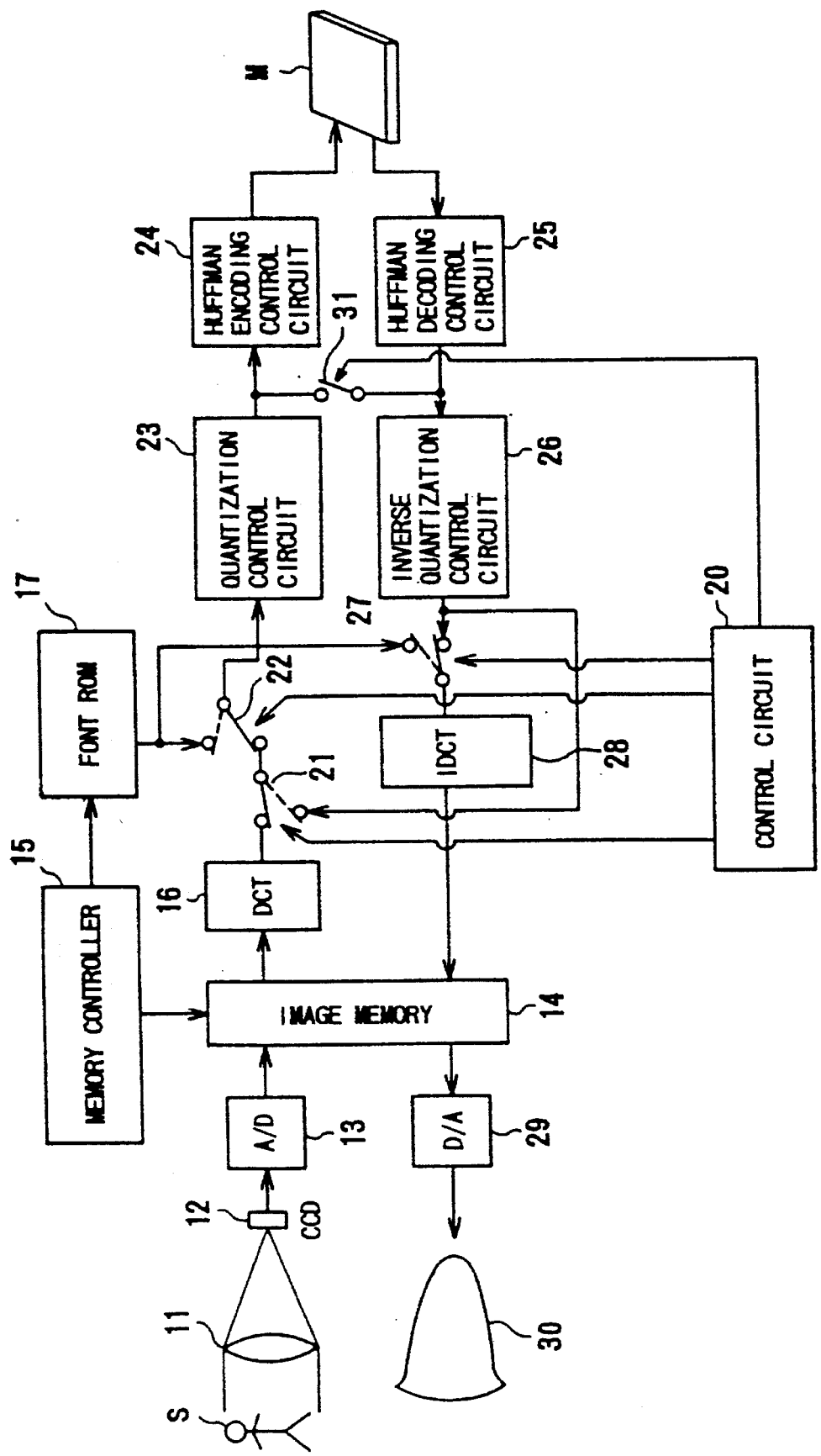
FIG. 1 is a block diagram of a first embodiment of the present invention.

The present invention will now be described with reference to embodiments shown in the drawings.

FIG. 1 is a block diagram of an electronic camera to which a character font combining apparatus of the first embodiment of the present invention is applied.

Light coming from an object S photographed is focused by a focus lens 11. The photographed image is focused on a light receiving surface of a CCD (charge coupled device) 12. A large number of photoelectric conversion elements are arranged on the light receiving surface of the CCD 12. Each photoelectric conversion element corresponds to one pixel. The photographed image is converted to an electrical signal by the photoelectric conversion elements and inputted to an A/D converter 13.

The photographed image is converted from an analog to digital format for each pixel at the A/D converter 13, subjected to the predetermined processing by a not shown signal processing circuit, and then stored in an image memory 14. When one frame's worth or one field's worth of image data is stored in the image memory 14, this image data is divided into a plurality of blocks by a memory controller 15 and outputted to a DCT processing circuit 16 for each block. Each block is constituted by 8×8 pixels as shown in (a) of FIG. 2. The image data Pxy of this block consisting of 8×8 pixels is subjected to two-dimensional DCT conversion in the DCT processing circuit 16 and converted to a DCT coefficient Suv as shown in FIG. 2(b). Namely, in the present embodiment, the DCT conversion is adopted as the orthogonal conversion of the image data.

The DCT coefficient Suv output from the DCT processing circuit 16 is inputted to a quantization processing circuit 23 via a first switch 21 and a second switch 22 for each block consisting of 8×8 pixels. The DCT coefficient Suv is quantized using the predetermined quantization table Quv as shown in FIG. 2(d) in the quantization processing circuit 23, and a quantized DCT coefficient Ruv as shown in FIG. 2(c) is obtained.

Note that, the quantization table Quv of FIG. 2(d) is determined according to for example a JPEG algorithm.

The quantized DCT coefficient Ruv outputted from the quantization processing circuit 23 is H-coded at a Huffman encoding processing circuit 24 and substituted to the code words and then recorded in a recording medium M as the encoded data.

Where a character is added to the original image, the DCT coefficient Suv outputted from the DCT processing circuit 16 is not inputted to the quantization processing circuit 23 for the block to which the character is added, but the DCT coefficient Suv read out from a font ROM 17 and corresponding to that character is inputted via the second switch 22 to the quantization processing circuit 23.

Figure 3:
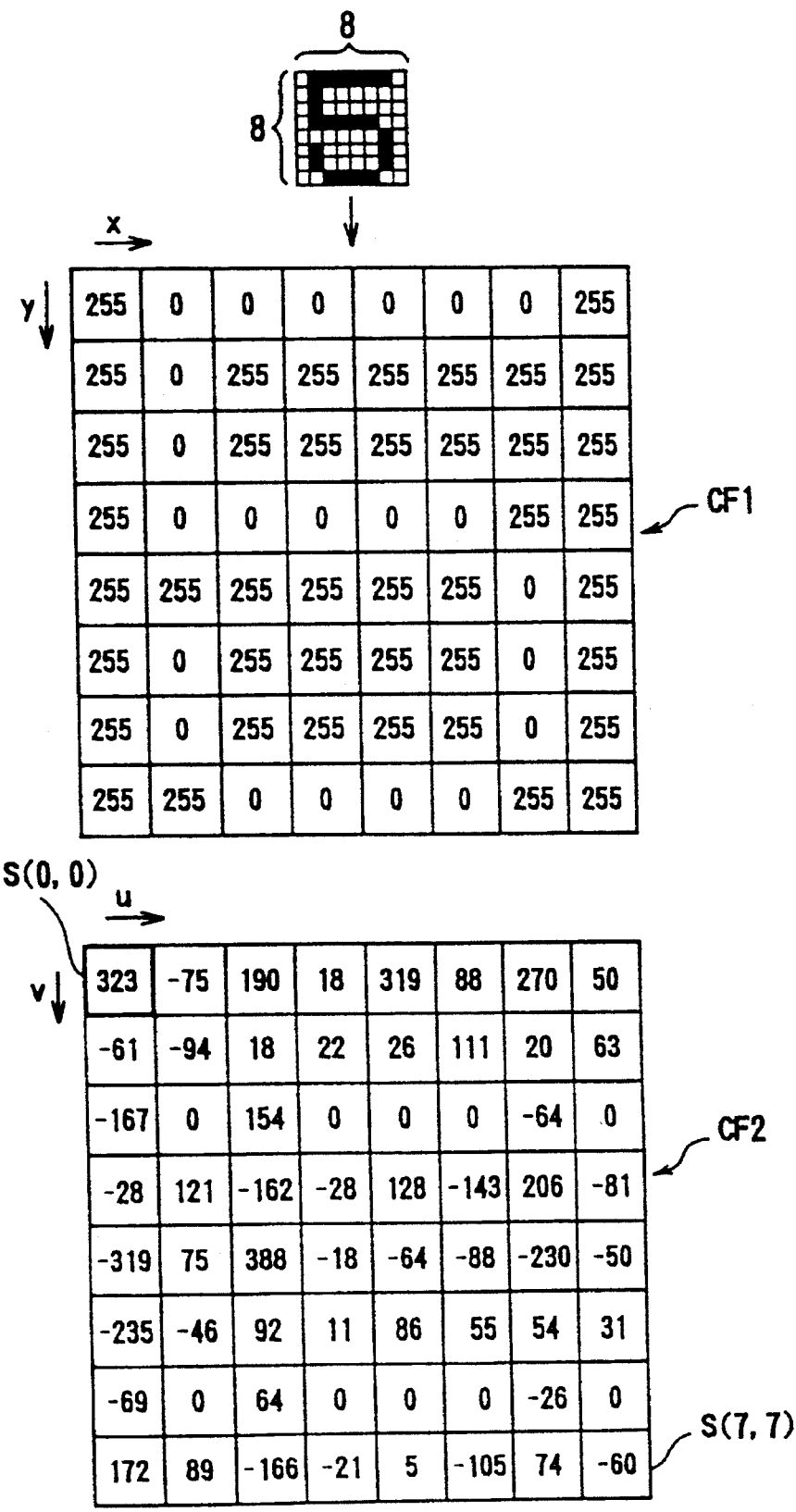
FIG. 3 is a view showing an example of the DCT coefficient of a character font.

This character added is inputted via a keyboard or the like connected to a control circuit 20. The character code is outputted from the memory controller 15 in accordance with this input operation, and data (DCT coefficient) in accordance with this character code is outputted from the font ROM 17. Namely, the DCT coefficient obtained by applying DCT conversion to the character font of the block consisting of 8×8 pixels is stored in the font ROM 17. For example, in the case of a character "5", as shown in FIG. 3, when the DCT conversion is applied to image data CF1 corresponding to this character, a DCT coefficient CF2 is obtained. DCT coefficients CF2 corresponding to various characters are stored in the font ROM 17.

The switching operations of the first and second switches 21 and 22 are controlled by the control circuit 20 provided with a computer. Namely, the DCT coefficient Suv outputted from the DCT processing circuit 16 or the font ROM 17 is alternately inputted to the quantization processing circuit 23.

A concrete example of the DCT conversion and quantization will be explained using FIG. 2. The image data Pxy of the block consisting of 8×8 pixels is DCT-converted at the DCT processing circuit 16, whereby the DCT coefficient Suv is obtained. In this drawing, $S_{00}$ is a DC (Direct Current) component, and $S_{01}$ to $S_{77}$ are AC (Alternative Current) components. The coefficient $S_{77}$ expresses the coefficient having the highest spatial frequency.

The DCT coefficient Suv is calculated at the quantization processing circuit 23 by the following equation using the quantization table Quv, and the quantized DCT coefficient Ruv is obtained.

$$Ruv = \text{round}(Suv/Quv) \ \{0 \leq u, v \leq 7\}$$

The term "round" in this equation means approximating to the closest integer. Namely, the quantized DCT coefficient Ruv as shown in FIG. 2(c) is obtained by division and rounding off between the respective elements of the DCT coefficients Suv and the respective elements of the quantization table Quv.

Operation of Huffman encoding the quantized DCT coefficient Ruv will be explained referring to FIG. 4 to FIG. 7.

The encoding method differs between the DC component $R_{00}$ and AC component (the quantized DCT coefficient Ruv other than the DC component $R_{00}$). The encoding of the DC component $R_{00}$ is carried out as follows.

First, a difference between the quantized DCT coefficient $R_{00}$ of the block to be encoded at present and the quantized DCT coefficient $R_{00}$ of one preceding encoded block is found. It is decided which of the groups shown in FIG. 4 this differential value belongs to. The code word expressing the number of that group is found from the code table (coding table of DC component) shown in FIG. 5. For example, when the quantized DCT coefficient $R_{00}$ of the block to be now encoded is 16 and the quantized DCT coefficient $R_{00}$ of one preceding encoded block is 25, the differential value is −9, and therefore it is decided that the number (SSSS) of the group to which the differential value=−9 belongs is "4" from the group number table of FIG. 4. Further, it is decided that the code word of that group number (SSSS) is "101" from the code table of FIG. 5.

Subsequently, the order of the differential value in that group in the group number table of FIG. 4 is expressed by an additional bit. For examples the differential value=−9 is seventh in order from the smallest in the group of the group number (SSSS)=4, and therefore the additional bit becomes "0110". Namely, the Huffman encode word of the quantization DC component $R(Y)_{00}$ of the block which is now being encoded becomes "1010110".

Figure 6:
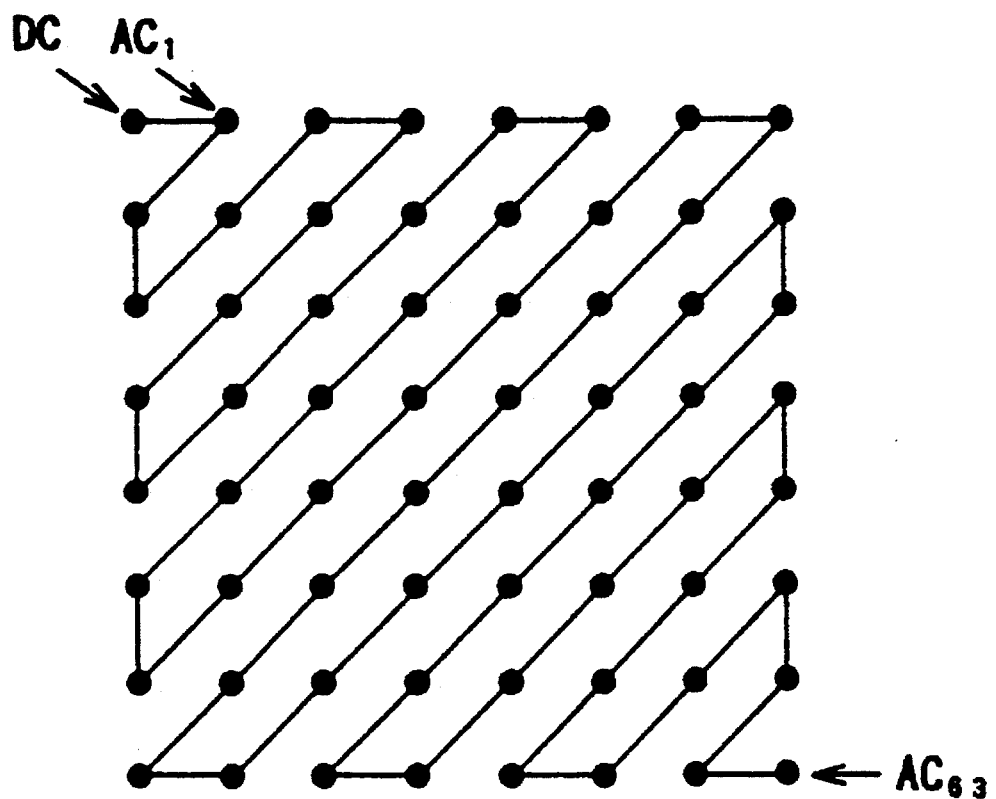
FIG. 6 is a view showing a zigzag scanning used when encoding AC components among the DCT coefficients.

On the other hand, in the encoding of the AC component of the quantized DCT coefficient, first, 63 quantized DCT coefficients are subjected to the zigzag scanning in an order shown in FIG. 6 and rearranged to one-dimensional array data. Then, it is decided whether or not the respective quantized DCT coefficient values arranged in one dimension are "0". When a quantized DCT coefficient is "0", that quantized DCT coefficient which is "0" is counted. By this, a length of continuity of "0"'s, that is, a run length (NNNN) is obtained.

Contrary to this, when the quantized DCT coefficient is not "0" the group classification the same as that for the DC component is carried out and, at the same time, the additional bit is obtained. The group classification of the quantized DCT coefficient of the AC component differs from the group classification of the DC component and is carried out for the quantized DCT coefficient thereof per se. Namely, when the quantized DCT coefficient is for example "4", a group number (SSSS) "3" is obtained referring to a table in the same way as that of FIG. 4. Also, the quantized DCT coefficient "4" exists at fifth place from the smallest in the group of the group number (SSSS)=3, and therefore the additional bit becomes "100".

Subsequently, the AC code table (not shown) is referred to, and for example where the run length of data immediately before the quantized DCT coefficient of "4" is "0", the code word "100" is obtained based on this run length and the group number (SSSS)=3. Then, by combining this code word "100" and the above-described additional bit "100", the two-dimensional Huffman encoding word "100100" is obtained.

The result of performing the Huffman encoding for the quantized DCT coefficient of FIG. 2(c) is indicated as the encoded data 100 of FIG. 7.

An explanation will now be made of decoding of the encoded data recorded in the recording memory M referring to FIG. 1 and FIG. 8.

The encoded data read out from the recording medium M is decoded to the quantized DCT coefficient Ruv (refer to FIG. 8(a)) of a block consisting of 8×8 pixels in the Huffman decoding processing circuit 25. This quantized DCT coefficient Ruv is subjected to an inverse quantization in the inverse quantization processing circuit 26 using the quantization table Quv (refer to FIG. 2(d)) used in the quantization processing circuit 23, whereby the DCT coefficient Suv (refer to FIG. 8(b)) is obtained for each block consisting of 8×8 pixels. This DCT coefficient Suv is inputted via a third switch 27 to the IDCT processing circuit 28. In the IDCT processing circuit 28, inverse discrete cosine conversion is carried out with respect to the DCT coefficient Suv, whereby the image data Pxy (refer to FIG. 8(c)) is restored for each block consisting of 8×8 pixels.

This image data Pxy is written in the image memory 14 by the control of the memory controller 15, and the original image array is restored in this memory 14. In this way, when one frame's worth or one field's worth of image data is restored and stored in the image memory 14, this image data is read out from the memory 14 by the control of the memory controller 15, converted to an analog signal at the D/A converter 29, and outputted to the display 30.

Where it is intended to add a character on the displayed screen when the encoded data recorded in the recording medium M is decoded and displayed on the display 30, when the DCT coefficient Suv of the block corresponding to the position at which that character is to be displayed is outputted from the inverse quantization processing circuit 26, the third switch 27 is changed over to the font ROM 17 side (position indicated by a broken line). Namely, the DCT coefficient Suv of the character font outputted from the font ROM 17 is inputted via the third switch 27 to the IDCT processing circuit 28 and subjected to the inverse discrete cosine conversion, thereby being written in the image memory 14 as the character data. Then, this character data is read out from the memory 14, converted to an analog signal, and outputted to the display 30.

Note that, the character added on the displayed screen is inputted via a keyboard or the like connected to the control circuit 20.

An explanation will be made of an operation for substituting a character font to a different character for an image recorded in the recording memory M in a state where the character font is added, and recording the same again in the recording medium M.

The first switch 21 is changed over to an inverse conversion quantization processing circuit 26 side (position indicated by a broken line), and the second switch 22 is set to the first switch 21 side (position indicated by a solid line). The encoded data of the image is read out from the recording medium M, and the quantized DCT coefficient Ruv is obtained at the Huffman decoding processing circuit 25. This quantized DCT coefficient Ruv is subjected to inverse quantization at the inverse quantization processing circuit 26, whereby the DCT coefficient Suv is obtained for each block. This DCT coefficient Suv is inputted via the first and second switches 21 and 22 to the quantization processing circuit 23.

The second switch 22 is usually connected to the first switch 21 side. When the DCT coefficient Suv of the block for which the character should be substituted is outputted from the inverse quantization unit 26, it is changed over to the font ROM 17 side. By this, the DCT coefficient Suv of the character font outputted from the font ROM 17 is inputted to the quantization processing circuit 23, and the DCT coefficient Suv of that block is outputted from the font ROM 17, substituted to the DCT coefficient corresponding to a desired character, and inputted to the quantization processing circuit 23.

In the quantization processing circuit 23, the DCT coefficient Suv is quantized using the quantization table Quv. This quantized DCT coefficient Suv is subjected to the Huffman encoding at the Huffman encoding processing circuit 24 and recorded in the recording medium M as the encoded data.

Note that, the substitution operation of the character font as described above is the same also for a case where character data is newly added to an image to which the character data is not added. Namely, when the encoded data of this image is decoded to the DCT coefficient Suv by the Huffman decoding processing circuit 25 and the inverse quantization processing circuit 26 and quantized at the quantization processing circuit 23 again, it is substituted to the DCT coefficient of a desired character output from the font ROM 17, whereby the character is added.

On the other hand, if the inverse quantization or quantization is always carried out in the inverse quantization processing circuit 26 and the quantization processing circuit 23 also for a block for which the substitution of the character font is not carried out, the time required for the substitution processing of the character font becomes long. Therefore, the apparatus is configured so that a bypass switch 31 actuated by the control circuit 20 is provided between the Huffman decoding processing circuit 25 and the Huffman encoding processing circuit 24. The quantized DCT coefficient decoded at the Huffman decoding processing circuit 25 is inputted directly to the Huffman encoding processing circuit 24 via the bypass switch 31 for the block for which the substitution of the character font is not carried out.

When the character font substitution operation occurs, and the Huffman encoding circuit encodes the DC component, the Huffman encoding processing circuit 24 performs a process different from new image data recording to medium M as will be explained referring to FIG. 9.

In FIG. 9, the frames indicate the blocks F11 to F15 and F21 to F25 each consisting of 8×8 pixels, respectively. Among the numerals in the respective frames, the numerals on the upper side of the lines indicate the DC components of the blocks, and the numerals on the lower side of the lines indicate the differential values of the DC components, that is, the differences between the quantized DCT coefficient $R_{00}$ (DC component) of the blocks and the quantized DCT coefficient $R_{00}$ (DC component) of preceding encoded blocks. For example, the DC component of the block F11 at the far left of the upper row is "13", and the DC component of the second block F12 from the left of the upper row is "4". Accordingly, the differential value of the block F12 is 4−13=−9. Note that, the blocks F11 to F15 of the upper row indicate the state before substitution of the character font, and the blocks F21 to F25 of the lower row indicate the state after substitution of the character font.

The image data are stored in the blocks F11 and F21 on the far left and the blocks F15 and F25 on the far right, respectively. In the upper row, the character data of "1", "2", and "4" are stored in the second to fourth blocks F12 to F14, and in the lower stage, the character data of "3", "4", and "8" are stored in the second to fourth blocks F22 to F24.

Here, it is assumed that the DC components of the character data of the blocks F22 to F24 of the lower stage are "5", "2", and "7", respectively.

The data outputted from the quantization processing circuit 23 is the differential value concerning the DC component, and the DC component per se is not outputted. Namely, when the differential value of the block F22 is obtained, the DC component of the block F21 cannot be used. Therefore, in the present embodiment, the differential value is obtained based on the DC component "4" of the block F12 before the substitution of the character data and the differential value "−9". Namely, the differential value of the block F22 is a=5−(4−(−9))=−8, and (4−(−9)) corresponds to the DC component of the block F21.

Note, such an operation in which the differential value is obtained is performed, prior to the quantization, in the quantization processing circuit 23.

The differential value b of the block F23 is obtained by the subtraction of the DC component of the block F23 from the DC component of the block F22. It is the same also for the differential value c of the block F24. Note that, the DC component of the block F24 is changed by the substitution of the character data, and therefore the differential value d of the block F25 becomes a value different from that before the substitution of the character data. Accordingly, it is necessary to calculate also this differential value d in the same way as the block F23 and F24.

As described above, in the present embodiment, where a character is added to the image data, DCT coefficients in the units of blocks consisting of 8×8 pixels among the DCT coefficients having the two-dimensional array found by applying the DCT conversion to the original image are substituted to the DCT coefficients of the desired character. Accordingly, it is not necessary to completely restore the image information encoded and recorded in the recording medium to write the character, and therefore it is not necessary to perform the DCT conversion and IDCT conversion. For this reason, the power consumption of the entire apparatus can be kept low and, at the same time, a reduction of the processing time can be achieved.

Note that, in the present embodiment, where the character written in the encoded data recorded in the recording medium M is substituted to another character, the DCT coefficient Suv outputted from the inverse quantization processing circuit 26 is inputted to the quantization processing circuit 23 via the first switch 22, but it is also possible to once store all of the DCT coefficients Suv in the memory, overwrite the DCT coefficient Suv of the character font on a predetermined DCT coefficient Suv in that memory, read out all of the DCT coefficients Suv from that memory, and input the same to the quantization processing circuit 23. In this case, the overwriting of the DCT coefficient Suv of the character font is carried out, whereby even in a case where the statistical nature of the DCT coefficient Suv of the image as a whole is changed, the quantization table Quv can be adjusted, and the optimum data compression by the quantization processing circuit 23 can be carried out.

Note that, in the present embodiment, an addition or substitution of the character data with respect to the image data was carried out in the form of the DCT coefficient, but it is also possible to perform the same in the form of the quantized DCT coefficient Ruv obtained by the quantization processing circuit 23. Namely, it is also possible to set the quantized DCT coefficient Ruv after performing the DCT conversion and quantization as the character data to be stored in the font ROM 17, substitute the quantized DCT coefficient Ruv of the image outputted from the quantization processing circuit 23 by the quantized DCT coefficient Ruv from the font ROM 17, and input the same to the Huffman encoding processing circuit 24. Note that, in this case, the quantization table Quv used in the quantization processing circuit 23 must be fixed.

Also, it is possible to adjust the density of the character in the restored image by adjusting the value of the coefficient $S_{00}$ (DC component) existing in the block consisting of 8×8 pixels of the character font. Therefore, in the processing of substitution by the DCT coefficient of the character font, the value of the DC component in the DCT coefficient Suv of the character to be substituted is increased or decreased from an average of the values of the DC components of the respective blocks existing in the vicinity of the block to be substituted to perform adjustment.

Note that, the first to third switches 21, 22, and 27 can be any of an analog switch, switches constituted by mechanical contact points, etc. and are not particularly critical. Further, it is also possible to connect the image memory 14 to the A/D converter 13, D/A converter 29, DCT processing circuit 16, and the IDCT processing circuit 28 by a local data bus.

Figure 10:
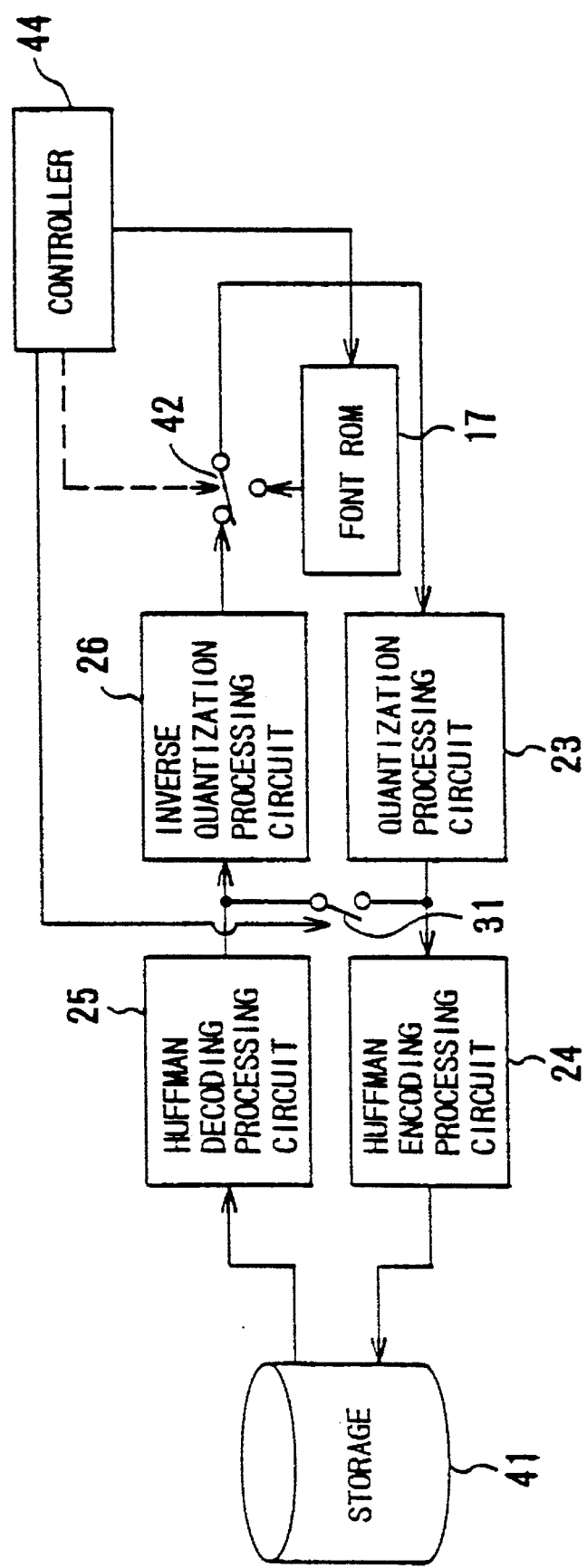
FIG. 10 is a block diagram of a second embodiment of the present invention.

FIG. 10 is a block diagram of the character font combining apparatus according to the second embodiment.

This embodiment shows a structure in which, a large volume of image data is compressed and stored in a large scale memory device such as a storage 41 and an image data base is constructed. The character data is added to that compressed image data. In the storage 41, a static image such as for example a map image is subjected to the DCT conversion, quantization, and encoding and stored as the encoded data.

The encoded data read out from the storage 41 is inputted to the Huffman decoding processing circuit 25, and the quantized DCT coefficient Ruv is found for each block consisting of 8×8 pixels. This quantized DCT coefficient Ruv is inputted to the inverse quantization processing circuit 26, and the DCT coefficient Suv is obtained for each block consisting of 8×8 pixels using the predetermined quantization table Quv. This DC coefficient Suv is inputted via the switch 42 to the quantization processing circuit 23.

The switch 42 usually exists on the inverse quantization processing circuit 26 side (position indicated by the solid line). When the DCT coefficient Suv of the block to which the character should be added is outputted from the inverse quantization processing circuit 26, it is changed over to the font ROM 17 side, and the DCT coefficient Suv of the block consisting of 8×8 pixels of the character font is inputted from the font ROM 17 to the quantization processing circuit 23. The switching operation of the switch 42 and the output of the character font from the font ROM 17 is controlled by the controller 44.

In this way, among the DCT coefficients Suv outputted from the inverse quantization processing circuit 26, the data at the desired pixel is substituted to the DCT coefficient Suv of the character font outputted from the font ROM 17 and inputted to the quantization processing circuit 23. This DCT coefficient Suv is converted to the quantized DCT coefficient Ruv using the predetermined quantization table Quv in the quantization processing circuit 23, encoded at the Huffman encoding processing circuit 24, and recorded in the storage 41.

Even in a case where the character data has already been added to the image data stored in the storage 41 and that character data is to be substituted to new character data, a similar processing to that described above is carried out. Namely, the DCT coefficient Suv is decoded from the encoded data read out from the storage 41 by the Huffman decoding processing circuit 25 and inverse quantization processing circuit 26, and the DCT coefficient Suv of the predetermined block is substituted by the DCT coefficient Suv outputted from the font ROM 17.

Accordingly, also by the present embodiment, in the same way as the first embodiment, the processing time of adding the character font to the image data stored in the storage 41 can be shortened, and the power consumption required for the processing can be kept low.

Also, in the same way as in the first embodiment, it is also possible to provide the bypass switch 31 switched by the controller 44 between the Huffman decoding processing circuit 25 and the Huffman encoding processing circuit 24. By this, for the block for which the substitution of the character font is not carried out, the quantized DCT coefficient decoded at the Huffman decoding processing circuit 25 is input directly to the Huffman encoding processing circuit 24 via the bypass switch 31, and the time required for the substitution processing of the character font is shortened.

It is also possible to perform the substitution processing by the DCT coefficient Suv of the character font using the semiconductor memory in the same way as the first embodiment. Namely, it is also possible to store the DCT coefficient Suv outputted from the inverse quantization processing circuit 26 in the semiconductor memory in exactly an amount of one pixel of information, overwrite the DCT coefficient Suv of the character font of the font ROM 17 on the above DCT coefficient Suv in the units of blocks, read out the DCT coefficient Suv from that memory, and input the same to the quantization processing circuit 23. In this case, the respective coefficients of the quantization table used in the quantization processing circuit 23 are adjusted considering the statistical nature of all DCT coefficients Suv of the semiconductor memory for which the substitution of the DCT coefficient of the character font is completed, and the quantized DCT coefficient Ruv is obtained in the quantization processing circuit 23 using this adjusted quantization table. According to this structure, it is possible to adjust the amount of information of the encoded data and adjust the image quality of the restored image.

Also in the second embodiment, in the same way as in the first embodiment, it is also possible to perform the substitution of the image data and the character data not by the format of the DCT coefficient, but by the format of the quantized DCT coefficient. Moreover, it is also possible to increase or decrease the value of the DC component of the character font considering the value of the DC component of the image data at the time of substitution of the character data.

In both of the first and second embodiments, it is also possible to perform the substitution in a state where the codes of the respective AC components in the DCT coefficients Suv of the character font are inverted considering the value of the respective DC components for which the character data is added or substituted. By this, the dense and sparse portion of the character font which is added or substituted can be inverted, and the visibility of the character on the restored image can be enhanced.

Note that, it is also possible to use other orthogonal conversions such as a Fourier transformation, Hadamard's transformations Harr transformation, etc. in place of the discrete cosine conversion.

Further, the size of the character font stored in the font ROM 17 was set as 8×8 dots in the above-described embodiments, but it is also possible to change this to the size of 16×16 dots etc. In this case, four DCT coefficients Suv of blocks consisting of 8×8 pixels in combination are stored in the font ROM 17 as one character, and image data of four blocks are substituted by four DCT coefficients Suv of the character font, whereby the character font is written in the image data.

Also, for characters having a size of 24×24 dots, nine blocks are put together by the DCT coefficient Suv of the character font for substitution.

In each embodiment, the size of the block of the conversion coefficient was set to 8×8 pixels, but it is also possible to change the same to a block size consisting of 4×4 pixels, 16×16 pixels, etc. In the present invention, the block size thereof is not particularly critical. However, the block size obtained by dividing the original image data and one unit of block size constituting the character font stored in the font ROM 17 must be the same.

As described above, according to the respective embodiments, the processing time for adding the character to the image data can be shortened, and the power consumption necessary for that processing can be reduced, and therefore where this apparatus is used for an electronic camera, the power consumption rate of the electronic camera can be lowered, and the use of the electronic camera over a long time becomes possible.

Note that, the image handled in the present invention is not restricted to a black and white one. Also, a color image is possible. For example, in the case of a color image constituted by color signals R, G, and B, the processings in the respective circuits of the DCT processing circuits 16 etc. are carried out independently for each of the color signals R, G, and B. Also, where the image to be handled is a color image, it is also possible to store the DCT coefficient for each of the color signals R, G, and B also for the DCT coefficient of the character font stored in the font ROM 17.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 5-154384 (filed on Jun. 1, 1993) which is expressly incorporated herein, by reference, in its entirety.

I claim:

1. A character font combining apparatus for substituting character data for image data, comprising:

means for storing compressed image data, said compressed image data being obtained by dividing digital original image data into a plurality of blocks, performing an orthogonal conversion, and encoding said data for each block;

decoding means for decoding image data read out from said image data storing means and means for determining an orthogonal conversion coefficient for each block;

character data storage means for storing a character font comprising at least an orthogonal conversion coefficient of one block;

encoding means for encoding said orthogonal conversion coefficient for each block to obtain encoded data and, at the same, for writing said encoded data in said image data storing means; and substitution means for substituting at least one said orthogonal conversion coefficients determined by said decoding means with said orthogonal conversion coefficient stored in said character data storage means and, at the same time, for writing said substituted orthogonal conversion coefficient to said encoding means.

2. A character font combining apparatus according to claim 1, said substitution means comprising a first switch means that selectively connects one of said decoding means and said character data storage means to said encoding means.

3. A character font combining apparatus according to claim 1, further comprising:

means for performing orthogonal conversion of said original image data and second switch means for connecting one of said orthogonal conversion means and said decoding means to said encoding means.

4. A character font combining apparatus according to claim 1, further comprising:

means for performing inverse orthogonal conversion of said orthogonal conversion coefficients from said decoding means and switch means for connecting one of said decoding means and said character data storage means to said inverse orthogonal conversion means.

5. A character font combining apparatus according to claim 1, further comprising:

a bypass switch for directly inputting said orthogonal conversion coefficient from said decoding means to said encoding means.

6. A character font combining apparatus according to claim 1, wherein, while said substitution is performed, said encoding means further determines a differential value of at least one of said plurality of blocks using the DC component and a previous differential value of said at least one of said plurality of blocks before said substitution.

7. A character font combining apparatus according to claim 1, said encoding means determines a differential value between the DC component of a second block and the DC component of a first block, said second block being adjacent to said first block, said first block being substituted when said block of said orthogonal conversion coefficient, from said decoding means, is substituted with said orthogonal conversion coefficient stored in said character data storage means.

8. A character font combining apparatus according to claim 1, said at least one block comprises a character to be substituted, and said orthogonal conversion coefficient of said at least one block is substituted with said orthogonal conversion coefficient corresponding with said character.

9. A character font substituting apparatus comprising:

orthogonal conversion means for dividing a digital original image data into a plurality of blocks and finding an orthogonal conversion coefficient of said image data for each block;

encoding means for encoding said orthogonal conversion coefficient and recording the same in a memory;

decoding means for decoding said image data recorded in said memory to find said orthogonal conversion coefficient for said each block;

character data storage means for storing said character font comprising said orthogonal conversion coefficient of at least one block;

substitution means for substituting at least one block of said orthogonal conversion coefficients from one of said orthogonal conversion means and said decoding means with said orthogonal conversion coefficient stored in said character data storage means, and at the same time, for outputting said substituted at least one block of orthogonal conversion coefficient to said encoding means.

10. A character font combining apparatus according to claim 9, said substitution means comprising a first switch means for selectively connecting one of said decoding means and said character data storage means to said encoding means.

11. A character font combining apparatus according to claim 9, further comprising:

switch means for connecting one of said orthogonal conversion means and said decoding means to said encoding means.

12. A character font combining apparatus according to claim 9, further comprising:

means for applying inverse quantization to said orthogonal conversion coefficients from said decoding means and switch means for connecting one of said inverse quantization means and said character data storage means to said inverse orthogonal conversion means.

13. A character font combining apparatus according to claim 9, further comprising:

a bypass switch for directly inputting said orthogonal conversion coefficient from said decoding means to said encoding means.

14. A character font combining apparatus according to claim 9, wherein said encoding means further determines the differential values of said at least one block using the DC component of orthogonal conversion coefficients of said at least one block before substitution, and using differential values after said orthogonal conversion coefficient, from said decoding means, is substituted with said orthogonal conversion coefficient stored in said character data storage.

15. A character font combining apparatus according to claim 9, said encoding means determines a differential value of the DC component of a second block which is adjacent to a first block to be substituted using the DC component of said second block and the DC component of said first block when said block of said orthogonal conversion coefficient, from said decoding means, is substituted with said orthogonal conversion coefficient stored in said character data storage means 16. A character front combining apparatus according to claim 9, wherein said at least one block comprises a character to be substituted, and said orthogonal conversion coefficient of said at least one block is substituted with said orthogonal conversion coefficient corresponding to said character.

* * * * *

UNITED STATES PATENT AND TRADEMARK OFFICE
CERTIFICATE OF CORRECTION

PATENT NO. : 5,473,704
DATED : December 5, 1995
INVENTOR(S) : N. ABE

It is certified that error appears in the above-indentified patent and that said Letters Patent is hereby corrected as shown below:

On the Title page, section [56], "References Cited", "U.S. PATENT DOCUMENTS", column 2, line 2, change "Kiyofugi et al." to ---Kiyofuji et al.---.

At column 11, line 36 (claim 1, line 19), change "coefficients" to ---coefficient---.

At column 12, line 42 (claim 10, line 2), delete "a".

At column 12, line 63 (claim 13, line 4), change "coefficient" to ---coefficients---.

At column 14, line 3 (claim 15, line 9), change "means" to ---means.---.

At column 14, line 4 (claim 16, line 1) change "front" to ---font---.

Signed and Sealed this

Twenty-fourth Day of December, 1996

Attest:

BRUCE LEHMAN

*Attesting Officer*   *Commissioner of Patents and Trademarks*